(12) United States Patent
Edberg

(10) Patent No.: US 9,898,535 B2
(45) Date of Patent: Feb. 20, 2018

(54) AVATAR-BASED SEARCH TOOL

(71) Applicant: Mark C. Edberg, Takoma Park, MD (US)

(72) Inventor: Mark C. Edberg, Takoma Park, MD (US)

( * ) Notice: Subject to any disclaimer, the term of this patent is extended or adjusted under 35 U.S.C. 154(b) by 311 days.

(21) Appl. No.: 13/752,348

(22) Filed: Jan. 28, 2013

(65) Prior Publication Data

US 2014/0214785 A1    Jul. 31, 2014

(51) Int. Cl.
*G06F 17/30* (2006.01)
*G06F 3/0482* (2013.01)

(52) U.S. Cl.
CPC ...... *G06F 17/30867* (2013.01); *G06F 3/0482* (2013.01)

(58) Field of Classification Search
CPC ......... G06F 17/30867; G06F 17/30864; G06F 3/0482
USPC ....................................................... 707/769
See application file for complete search history.

(56) References Cited

U.S. PATENT DOCUMENTS

| | | | |
|---|---|---|---|
| 7,913,176 B1 | 3/2011 | Blattner et al. | |
| 8,082,242 B1* | 12/2011 | Mysen | G06F 17/30699 707/711 |
| 8,271,475 B2* | 9/2012 | Hamilton, II | G06F 17/3066 707/710 |
| 8,301,615 B1* | 10/2012 | Riley | G06F 17/30864 707/707 |
| 2008/0158232 A1 | 7/2008 | Shuster | |
| 2008/0208674 A1* | 8/2008 | Hamilton | G06Q 30/0209 705/14.12 |
| 2009/0307620 A1 | 12/2009 | Hamilton, II et al. | |
| 2010/0070883 A1* | 3/2010 | Hamilton, II | G06N 5/022 715/757 |
| 2010/0169801 A1 | 7/2010 | Blattner et al. | |
| 2011/0252014 A1* | 10/2011 | Mital et al. | 707/706 |
| 2012/0079046 A1* | 3/2012 | Murphy | G06N 3/006 709/206 |
| 2013/0024801 A1* | 1/2013 | Leydon et al. | 715/780 |
| 2013/0151602 A1* | 6/2013 | McClelland et al. | 709/204 |
| 2014/0046963 A1* | 2/2014 | Fish | G06F 17/30867 707/748 |

(Continued)

OTHER PUBLICATIONS

"AlterEgo," Web page <searchalterego.com>, Oct. 14, 2013, retrieved from Internet Archive Wayback Machine <https://web.archive.org/web/20131014074029/http://searchalterego.com> on Dec. 7, 2016.*

(Continued)

*Primary Examiner* — Alford Kindred
*Assistant Examiner* — Jesse P Frumkin
(74) *Attorney, Agent, or Firm* — Michael L. Greenberg, Esq.; Greenberg & Lieberman, LLC

(57) ABSTRACT

A method of performing a digital search, wherein the result set returned is additionally narrowed via a virtual personality, represented by an animated avatar selected by the user prior to enacting the search. The avatar consists of a virtual identity, which, when reduced to keyword characteristics and then applied to a search algorithm, enables the filtering of result sets according to the inferred desires of the hypothetical individual instantiated by the virtual identity itself, expressed as an avatar.

11 Claims, 9 Drawing Sheets

(56) References Cited

U.S. PATENT DOCUMENTS

2014/0108371 A1* 4/2014 Swerdlow ............ G06F 3/0482
                                                707/706
2014/0237378 A1* 8/2014 Gonen et al. ................ 715/745
2014/0351156 A1* 11/2014 Orban ................ G06Q 10/1053
                                                705/321
2014/0379752 A1* 12/2014 Dawson .................. H04L 67/10
                                                707/770
2015/0127664 A1* 5/2015 Bolger .................... A63F 13/12
                                                707/749

OTHER PUBLICATIONS

"Custom Ranking—Custom Search—Google Developers" Web page <https://developers.google.com/custom-search/docs/ranking>, May 5, 2012, retrieved from Internet Archive Wayback Machine <https://web.archive.org/web/20120605181528/https://developers.google.com/customsearch/docs/ranking> on Dec. 7, 2016.*

Kandogan, Eser, Rajasekar Krishnamurthy, Sriram Raghavan, Shivakumar Vaithyanathan, and Huaiyu Zhu. "Avatar semantic search: a database approach to information retrieval." In Proceedings of the 2006 ACM SIGMOD international conference on Management of data, pp. 790-792. ACM, 2006.*

* cited by examiner

FIG. 3 - Smartphone App Embodiment

AVATAR-BASED SEARCH TOOL

This is a non-provisional application of provisional application No. 61/591,470 filed on Jan. 27, 2012 and priority is claimed thereto.

FIELD OF THE PRESENT INVENTION

The present invention relates to computer search protocols, and more specifically, to internet-based search protocols designed to return specific sets of results based on the desires of a user. The present invention employs personified avatars designed to represent differing aspects of a user's potential search desires, manifested as characteristics that are contextually sensitive to the user's intent for performing the search. Filters are applied automatically to search results based on the user-selected avatar, facilitating the discovery of the ideal search result.

BACKGROUND OF THE PRESENT INVENTION

Since the inception of a public internet, users of the internet have always required a means of searching the web for the information they want. Search engines have been created to facilitate this task by providing a central location for users to access links to a variety of other websites. As the internet expands in size daily, the organization of information and websites is crucial to achieving optimal information access. As more websites are created, more websites are apt to match the search criteria provided by a user; however, these matches may not be the most optimal or ideal for the intent of the user. Therefore, the user is frequently required to narrow his or her search with additional adjectives and qualifiers.

Currently, when a search is requested by a user to the World Wide Web, conventionally referred to as the internet, the success of the search is determined by the keywords/terms the user elects to type into a search field, together with the logic of the search algorithm employed by the search engine corporation, such as Google, Yahoo!, Bing, etc. Regarding the latter, Google, for example, uses a page-ranking algorithm by which the search finds sites and hyperlinked sites related to the search term and places them in a rank order based on the degree to which they are accessed by others (as an indicator of importance).

However, a search may have to be done a number of times to produce results that are close to the user's goals, known as the ideal search result. Occasionally, a user fails to retrieve the ideal search result because it is too difficult to find with proper keyword tagging, or the user simply gives up in frustration after a period of time. Frequently, numerous adjectives or modifiers are required within the search field, in order to custom tailor the search for the specific desirable results. If there were a way that these modifiers or filters could be applied to a search in a coherent and easy manner, then the user could save time on future searches that would contain similar modifiers or filters on the search criteria (keywords). If there were a way to easily incorporate this concept into a browser toolbar, internet searches could be customized easily via a graphical interface. The filter criterion could be personified into a graphical representation of the characteristics of the search, embodied as an avatar with a specific search "persona".

Thus, there is a need for a method of searching the internet for information in a specific manner that may be shaped in accordance with the specific filters desired by an individual in a specific situation. A means by which users may rapidly select custom search filters based on avatars that appear to embody the very search filters they enact would greatly facilitate and expedite the repetitive search process.

U.S. Pub. No. 2010/0169801 for "Multiple Avatar Personalities" by Blattner et al., published on Jul. 1, 2010, shows enablement of multiple online personas in which "[a]t least two identities within a communications environment to whom messages may be directed are identified. A first persona of a user is enabled to be projected to a first of the identities while a second persona of the same user is enabled to be concurrently projected to a second of the identities. The first and second personas each include an avatar capable of being animated, and the first persona and the second persona differ." Blattner et al.'s invention is specifically identified as placed "in an instant messaging communications session". This patent is almost identical to U.S. Pat. No. 7,636,755 for "Multiple Avatar Personalities" by Blattner et al.

U.S. Pub. No. 2009/0307620 for "System for Concurrently Managing Multiple Avatars" by Hamilton, II et al., published on Dec. 10, 2009, shows an approach for allowing a user to create multiple instantiations, or clones, of an avatar in a virtual universe. Although Hamilton, II et al. create a clone of the avatar, the cloned avatar can have differing characteristics. In section [0040], we see that "a clone may be formed with a restricted subset of the characteristics of the master"; in section [0041], we read that "a plurality of avatars may be simultaneously and collectively controlled by a user. This collective control may include features such as enabling a specific movement, enabling text messaging, enabling speech, or enabling any other action in multiple avatars." Although this differs from the rest of the present invention, Hamilton, II et al. does allow a user to assign different characteristics to more than one avatar.

U.S. Pub. No. 2008/0158232 for "Animation Control Method for Multiple Participants" by Shuster, published on Jul. 3, 2008, shows a virtual reality universe process in which multiple avatars are independently controlled in response to client input. Unlike the present invention, Shuster makes no specific mention of a user employing multiple avatars tailored to different personas.

U.S. Pat. No. 7,913,176 for "Applying Access Controls to Communications with Avatars" by Blattner et al., issued on Mar. 22, 2011, shows a method of applying access control information to an instant message by determining the access control information of the sender's avatar and the receiver's avatar. Unlike the present invention, Blattner et al. is a means of controlling a user's access within an instant messaging system.

Thus, none of the current patents reviewed above overtly connect the use of avatars to internet searching.

SUMMARY OF THE PRESENT INVENTION

The present invention is a tailored search tool and algorithms designed to enable a user to rapidly and easily select avatar-based search identities on-the-fly. Each avatar represents a specific "persona" or "identity" that shapes the overarching characteristics of the search. By changing the avatar, the user is selecting a specific set of search parameters that correspond to the identity represented by the avatar, which is selected by the user. For example, if a user selects an avatar that appears adventurous, such as a virtual embodiment of the adventurer "Indiana Jones," then the search engine will return results that would appeal to an adventurous personality or adventurous desires.

Thus, if a user were to type in "vacations in Orlando, Fla.," and select the Adventurer avatar for the search (a persona like the "Indiana Jones" film character), then only adventurous, perhaps even dangerous vacation destinations, activities, and accommodations would be returned in the vicinity of Orlando, Fla., such as skydiving, rock climbing, safaris, diving to underwater wrecks, etc. Additionally, the historian or archeological component of the "Indiana Jones" influenced Adventurer avatar may influence search results as well, potentially returning public excavation sites or museums such as the Dinosaur World in Orlando, Fla., or may suggest the La Brea Tar Pits in California, due to the similarity of California to Florida. Similarly, if the user were to type in "new cars" or "car rentals," the result set would include cars and sport-utility vehicles used for adventurous off road applications such as Jeeps™, Land Rovers™, or other similar vehicles.

Conversely, if another avatar is selected, such as the "Parental Unit" avatar, only search results pertaining to a family-friendly, PG-13 atmosphere will be returned—thus weeding out all search results featuring vacations not suitable for children or small to large groups. The "Parental Unit" avatar would preferably only return generic results that are safe and appropriate for families. Such avatar-based searched could be done for any topic.

It is envisioned that there are at least three different avatars available by default that users are presented with upon opting to use the present invention. However, additional avatars will be developed, and users may optionally set up additional custom avatars independently via a request form that is part of the Alter Ego functionality. Custom avatars may be given a name by a user, who then may ascribe a vast number of search 'adjectives' designed to describe the type of personality the avatar has, such as 'outgoing,' 'thrill-seeking,' 'adventurous,' or 'intellectually curious,' In effect, the user is actually shaping the search parameters that would be ideal for a hypothetical person. This is tantamount to an advanced search with multiple filters consisting of numerous keywords entered into a traditional search field.

BRIEF DESCRIPTION OF THE DRAWINGS AND SCREEN SHOTS

Figure 5:
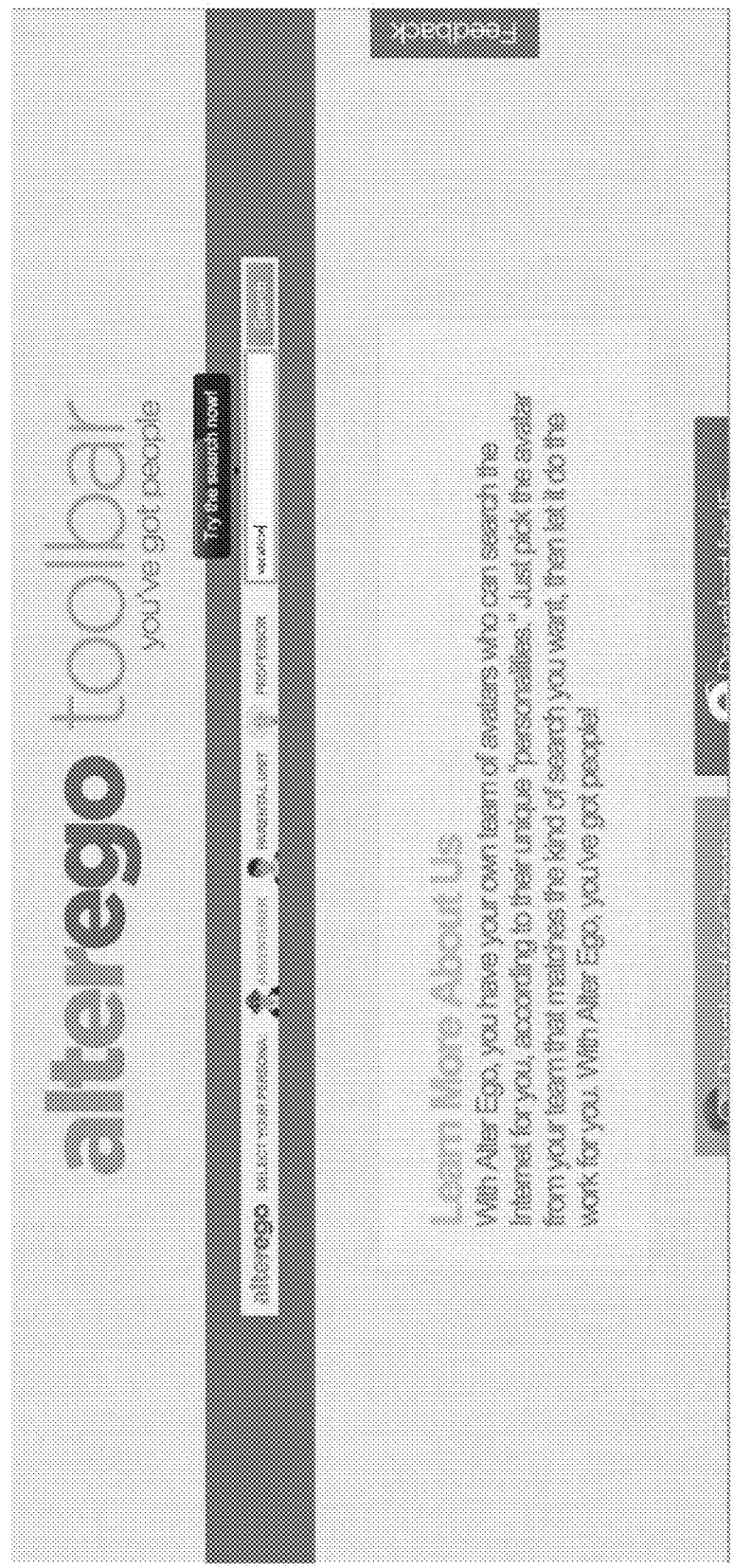

FIG. 5 displays a screen shot of top of the search tool download home page of the present invention.

Figure 6:
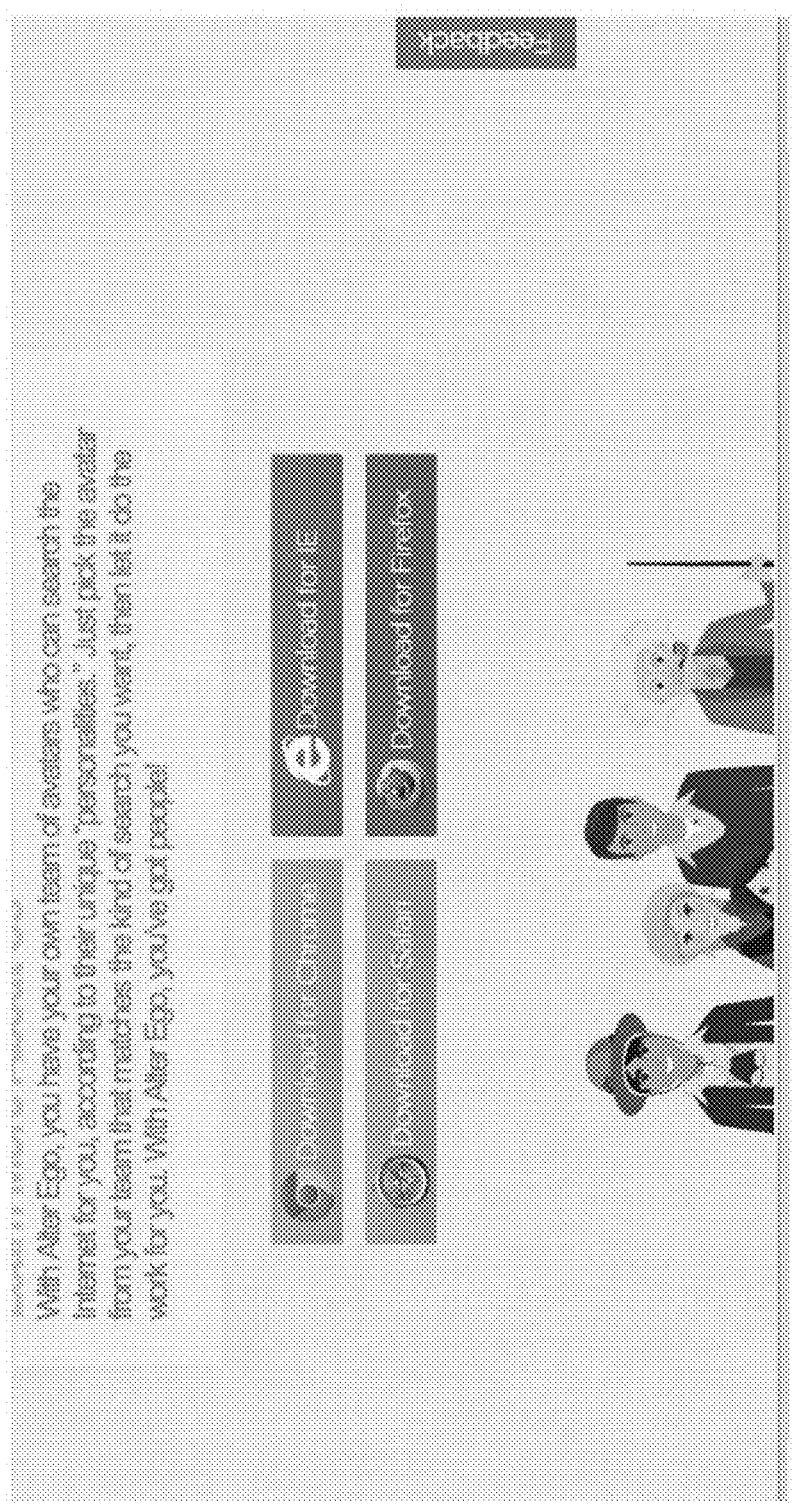

FIG. 6 exhibits a screen shot of the bottom of the search tool download home page of the present invention.

Figure 7:
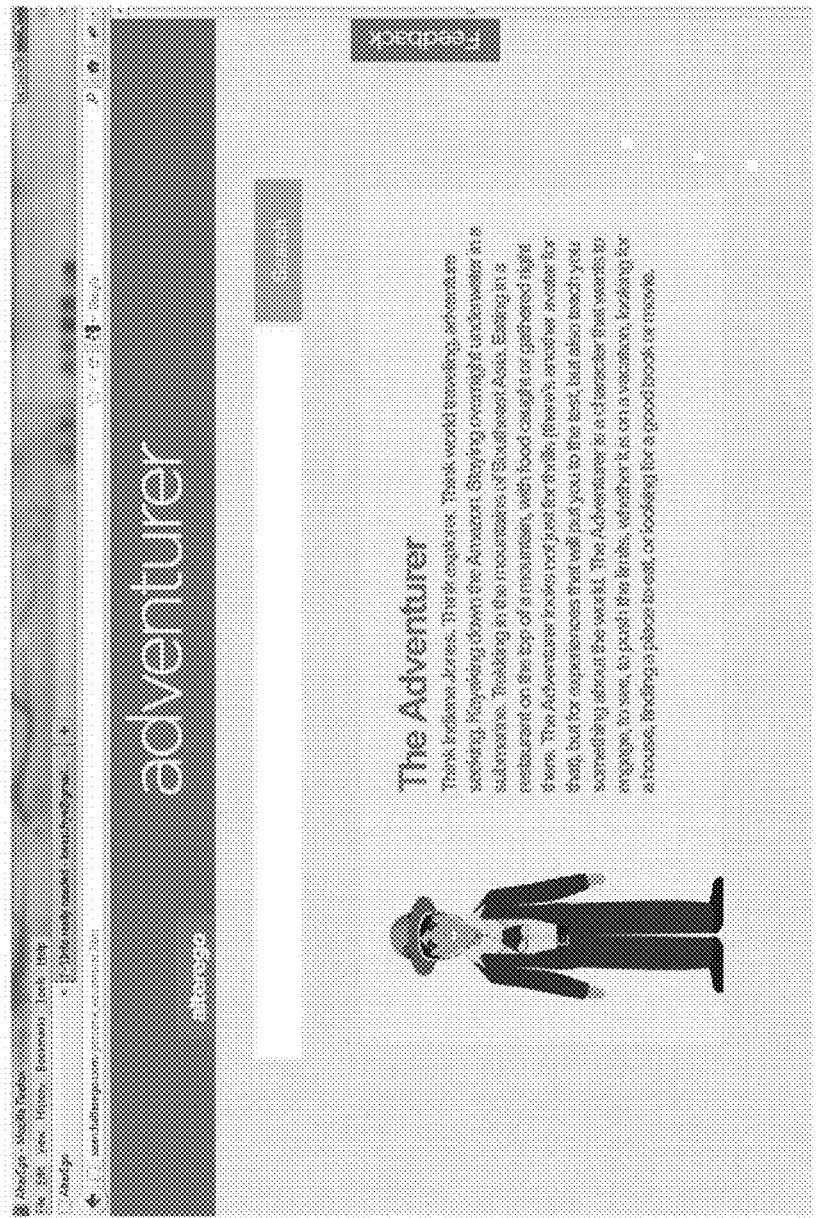

FIG. 7 shows a page a user would see after selecting an avatar (The Adventurer) of the present invention, and entering a search term (in this case, "vacation")

Figure 8:

FIG. 8 shows the results using the Adventurer avatar to search for vacation.

Figure 9:
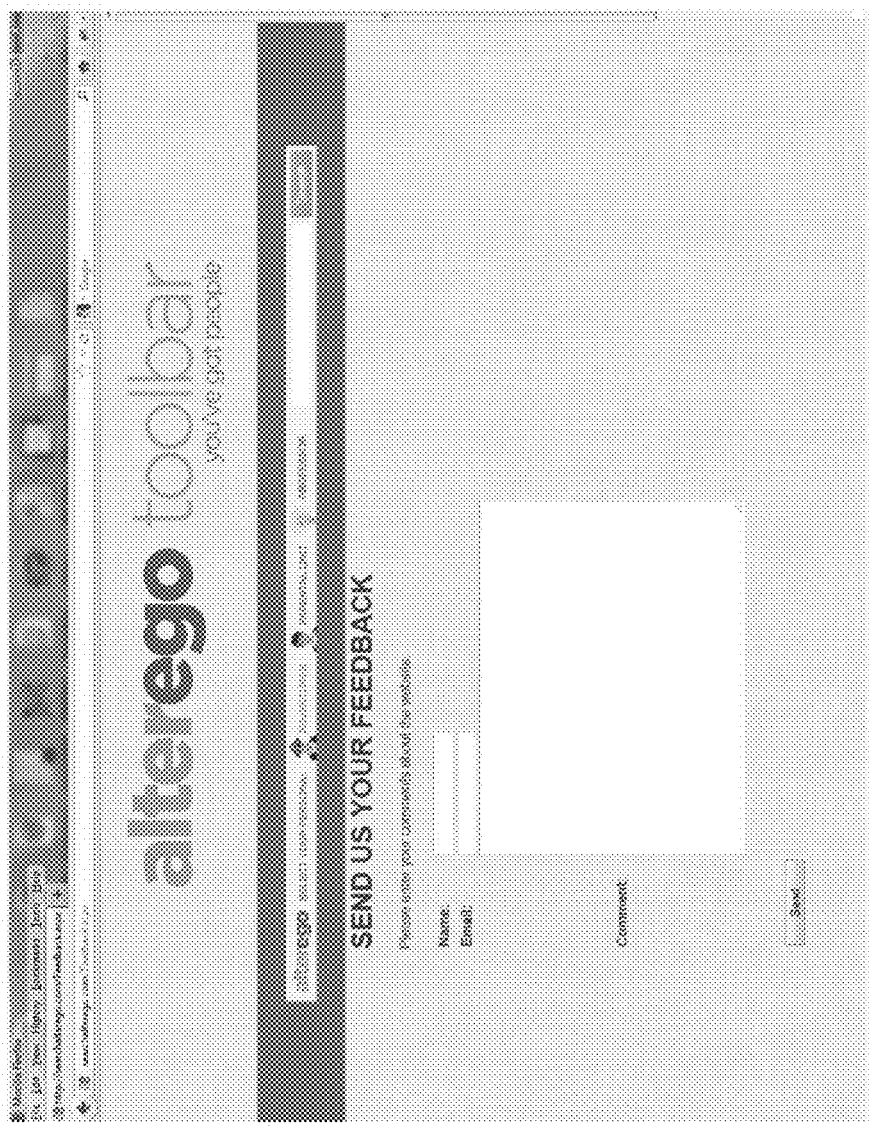

FIG. 9 shows the Feedback form page of the present invention intended to capture user feedback.

DETAILED DESCRIPTION OF THE PREFERRED EMBODIMENT

The present invention, a method of searching the internet, employs a computer (stationary or mobile), preferably connected to the internet, in order to establish a virtual identity that may be taken on by a user. This virtual identity, known as an avatar (120), embodies a set of characteristics that are conventionally attributed to a particular category of real-life person, such as 'adventurer,' 'parental unit,' 'sports fanatic,' etc. The computer translates the characteristics of the avatar (120) into search string modifiers and filters, embodied in an advanced search algorithm, and designed to expressly return search results that would only appeal to a real-life person maintaining the characteristics ascribed to the avatar (120). These search strings are programmed using JavaScript or other applicable languages. For example, an avatar based on an 'adventurous' person is apt to include characteristics such as rugged, mountain-loving, naturalistic, dangerous, high-altitude, deep-sea, frightening, adrenaline-pumping, etc. These characteristic adjectives are then integrated into the internet search, which are used by the computer to filter the results, thereby only displaying websites featuring aspects relating to the outlined characteristic adjectives. There are also filters added to the search string that are coded as exclusions, excluding particular terms or websites that could otherwise turn up in search results but that do not represent results for a given avatar.

Figure 1:
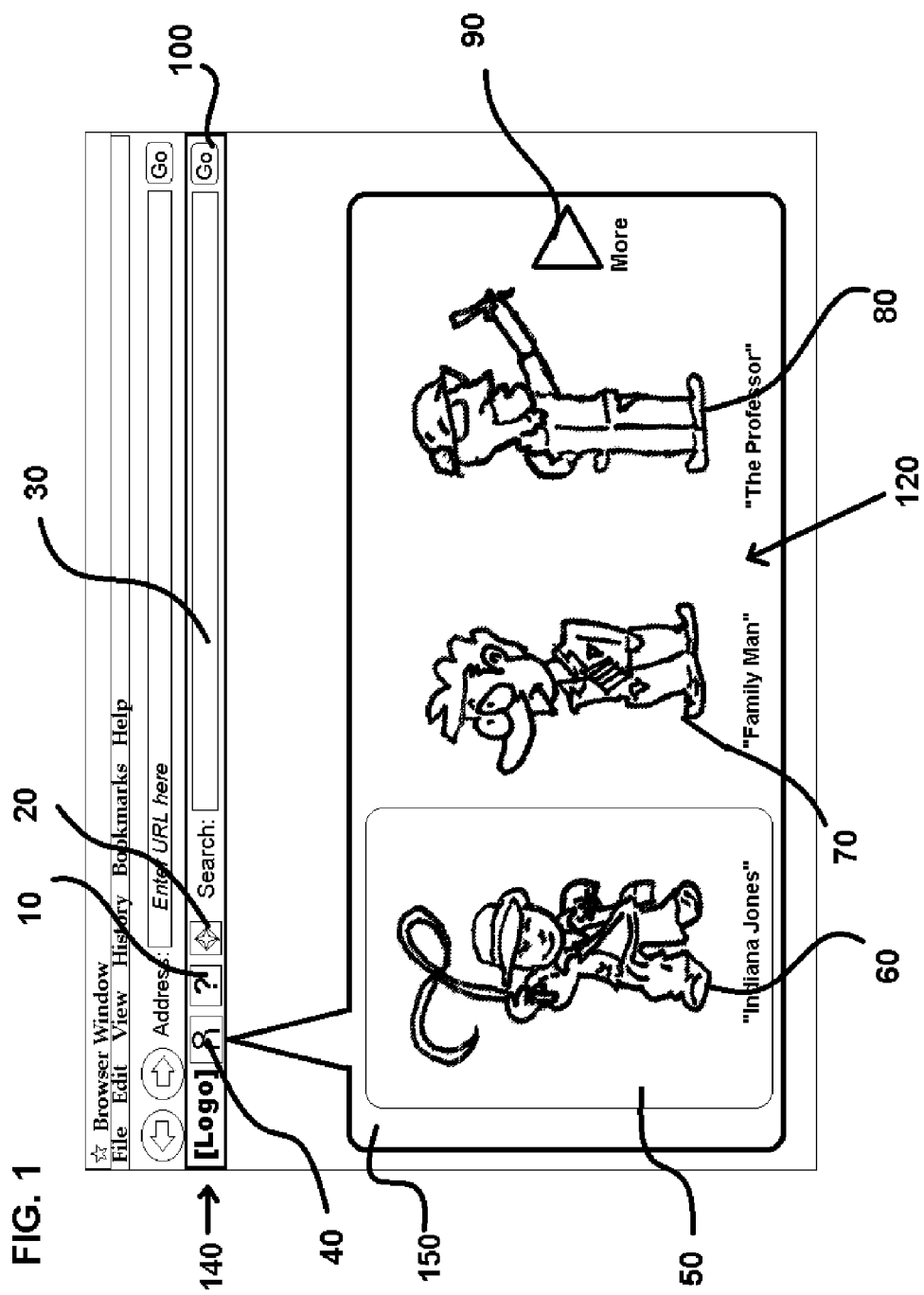
FIG. 1 illustrates the browser toolbar of the present invention, featuring three primary search avatars as examples.

As with a conventional internet search, a user may search for practically anything ranging from vacations and vehicles, to transportation and places to eat. However, if a search is performed with one of the avatars (120) of the present invention selected, only results pertaining to the virtual identity or personality of the avatar (120) will be returned. Therefore, if a user searches for 'vacation' while the adventurous avatar, shown as 'Adventurer avatar' (60) in FIG. 1, is selected, only adventurous vacation destinations with a culturally interesting or even exotic character will be returned in the search results, such as cave exploration, wreck diving, climbing to archaeological sites, or safari expeditions.

Figure 2:
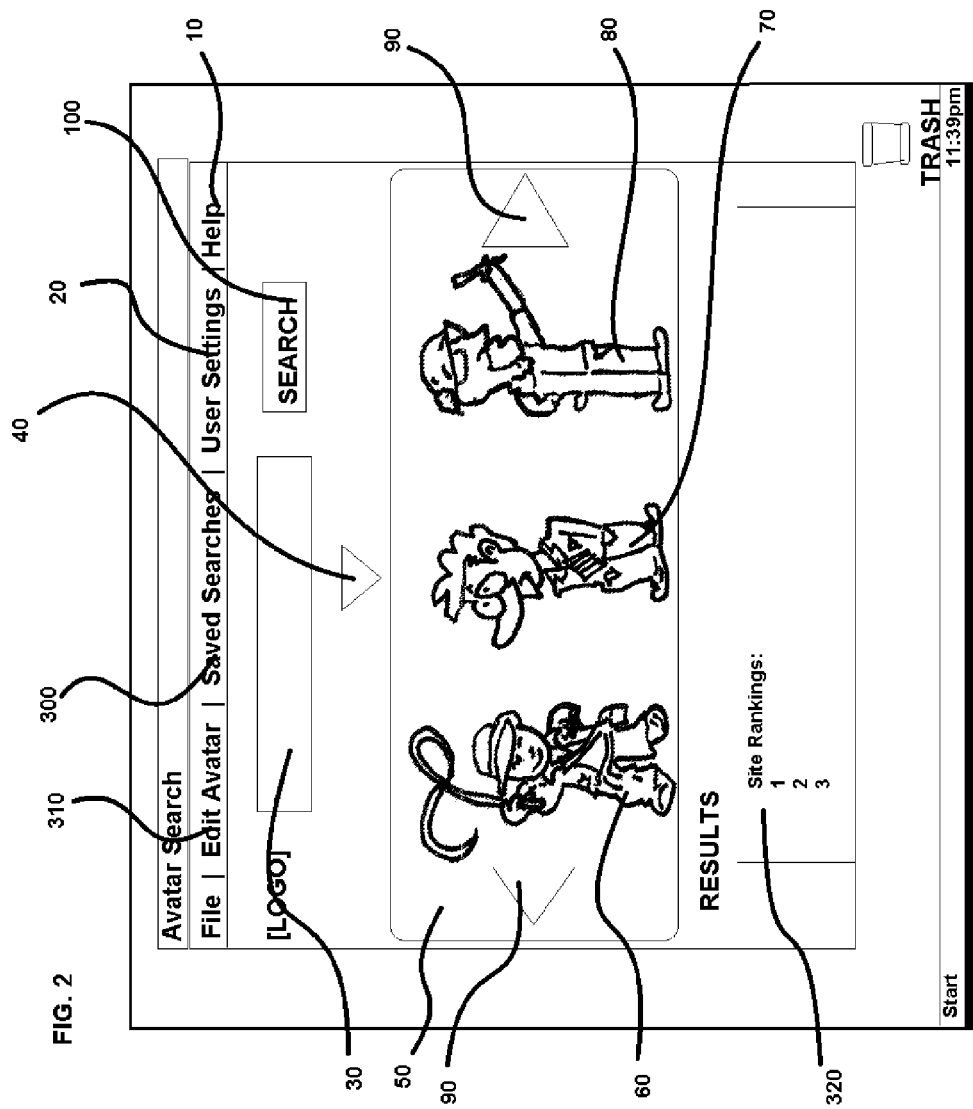
FIG. 2 depicts the present invention as embodied within an independent computer application.
Figure 4:
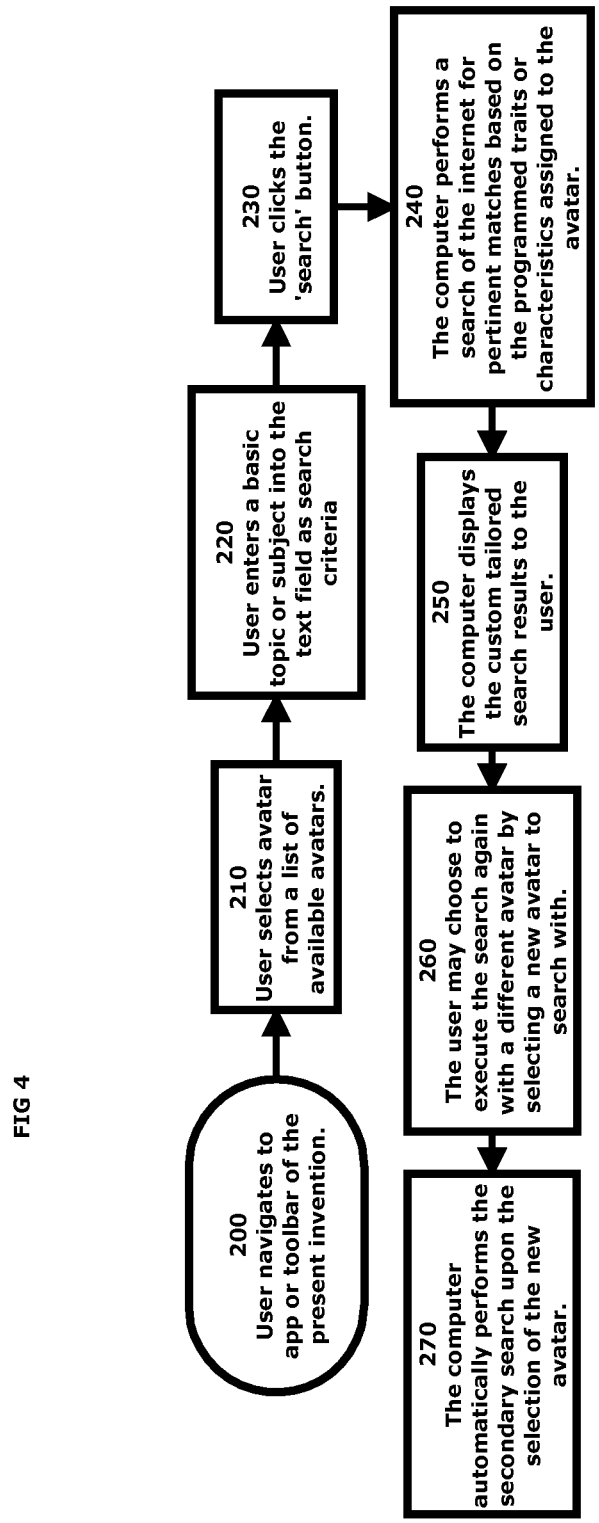
FIG. 4 shows a flow chart, outlining the method of the present invention.

The system of the present invention can best be seen in FIG. 2, which shows the method of the present invention as it would be instantiated by a user on a conventional computing platform or device, preferably connected to the internet. It is envisioned that the present invention is not to be limited to specific types of searches, but indeed may be used to search the internet at-large or any intra-site search as well. As one can see in FIG. 4, the first step of the process is "the user navigates to the app or toolbar of the present invention" (200). Then "the user selects an avatar from a list of available avatars" (210) by clicking on the avatar selection icon (40) found on the toolbar (140) of one embodiment of the present invention.

The act of a user selecting an avatar (210) is accomplished by the user via a peripheral device, such as a mouse or keyboard, mobile phone, or tablet (such as an iPad™) interacting with a computer application displaying a set of animated, graphical avatars. To illustrate the process, please refer to FIG. 1, which illustrates a toolbar (140) with three icons representing the following three default hypothetical avatars: Parental Unit (70), Adventurer (60), and the Professor (80). When selecting an avatar from the toolbar (140) in this embodiment of the present invention, the user preferably clicks on the avatar selection icon (40) which preferably causes a popup (150) to appear, as seen in FIG. 1. The popup (150) contains avatars (120). The default avatars preferably bundled with the preferred embodiment of the present invention include the Adventurer (60), the Parental Unit (70), and the Professor (80), as seen in FIG. 1.

After the user selects an avatar (210), the user enters basic search keywords into text field as search criteria (220).

These keywords are preferably broad, and preferably describe the item or topic that is the subject of inquiry. Then "the user preferably clicks the 'search' button" (230) to begin the search. 'The computer performs a search of the internet for pertinent matches based on the programmed traits or characteristics assigned to the avatar' (240). These specific search parameters need not be keyed in manually by the user, as they are preferably programmed into the avatar's unique algorithm, embodied as the characteristics of the avatar's persona. Finally, 'the computer displays the custom tailored search results to the user' (250). This constitutes the generic form of the process of the present invention which may be observed in FIG. 4.

The same process using an actual demonstration version is shown in FIGS. 5-8, which are screen shots from the site alterego.com which has been secured as a domain name by Mark Edberg (patent holder). FIGS. 5 and 6 represent the home page from which a user would select an avatar, and if desired download Alter Ego for any browser (e.g., Google Chrome, Internet Explorer, etc.). The home page also includes tabs for more detailed descriptions of each avatar, and a feedback function for comments. FIG. 7 shows the page resulting from the selection of the Adventurer, with a search term entered in the search field. Once the user clicks the search key, search results are produced as shown in FIG. 8.

The present invention also incorporates an instruction manual providing a general description of how the search process is tailored for the persona of each avatar. The instruction manual also outlines the optional process for customizing each avatar within the set, as well as creating new avatars. The information icon (10), when clicked, provides this instruction manual, as well as additional information to the user. The settings icon (20), when clicked, displays a menu of settings designed to customize the user's experience with the present invention. Settings and options found within the settings menu of the present invention may include editing avatar personas, customizing the toolbar (140) of the present invention, toggling search history settings, and other various settings. FIG. 9 is a screen shot of a Feedback Form to capture user feedback (programmed using C$ or other appropriate language).

When the present invention is employed, regardless of the embodiment, search results for a given phrase or keyword(s) will return different results depending upon the avatar (120) currently selected by the selection cursor (50). For example, suppose a user wants to search for vacation or travel possibilities. If the Parental Unit avatar (70) is selected via the active selection cursor (50), the algorithm will (by design) search for travel/vacation sites that are family-friendly, not overly dangerous or risky, and so on. In contrast, if the Adventurer avatar (60) is selected, the search algorithm will seek adventure travel sites and information, even more specifically adventure travel websites that have a cultural or archeological component. The search algorithms for each avatar will include iterative searches based on a set of ranked keywords consonant with the avatar's user-defined for default persona. Subsequently, the present invention employs the search engine's conventional search algorithm (typically a page ranking system that may include site popularity (traffic) as key ranking criteria).

As another example, suppose a user wants to find out something about applications of child psychology, but wants much more than just popular or basic descriptions, and is willing to read academic and scientific material. He/she would select the Professor avatar (80), which would instruct the computer to conduct an in-depth search befitting its persona, as follows:

1) User wants to find out in-depth information about applications of child psychology. He/she selects the "Professor" avatar (80) from the toolbar (140).

2) Selection of that icon triggers specific search algorithm based on ranked and linked search terms associated with the Professor avatar's "persona"—such as linking child psychology and applications with research evidence, interventions, studies, program evaluations, experimental results, applied research, American Psychological Association, National Institutes of Health, National Institute of Child Health and Human Development, National Institute of Mental Health, best practices, and links to academic databases such as JSTOR, PsychInfo, Medline and others which contain online journal access for such peer-reviewed journals as *Developmental Psychology, Journal of Child Psychology and Psychiatry, Journal of Abnormal Child Psychology, Child Development*, and countless others. The search terms, as noted earlier, include specific exclusion filters so that, for example, the Professor search does not include popular magazines such as *People or Us*.

3) Using these keyword conventions, the search algorithm conducts multiple search iterations and, working within the browser, ranks websites encountered in order with accompanying hyperlinks, constituting the search result set.

4) Thus without the user actually going through a trial and error keyword search, the professor avatar (80) based search produces results conforming to characteristics of the corresponding avatar.

In short, the search uses the keyword-defined 'identity' of the avatar to conduct a specific kind of search. The user does not have to try out different search terms and search via the traditional laborious manner, because the underlying parameters of the search are assumed per the characteristics of the avatar. These parameters are instantiated as coded search strings and search filters. Therefore, internet searching can be highly user-friendly, and not necessarily dependent on literacy, education level, or age, as age-appropriate avatar sets could be developed for children or other ages. Or, as noted below, internet usage could be facilitated cross-culturally and in low literate countries through culturally-tailored avatars/icons. Other business-specific or activity-specific avatar sets could also be developed.

Figure 3:
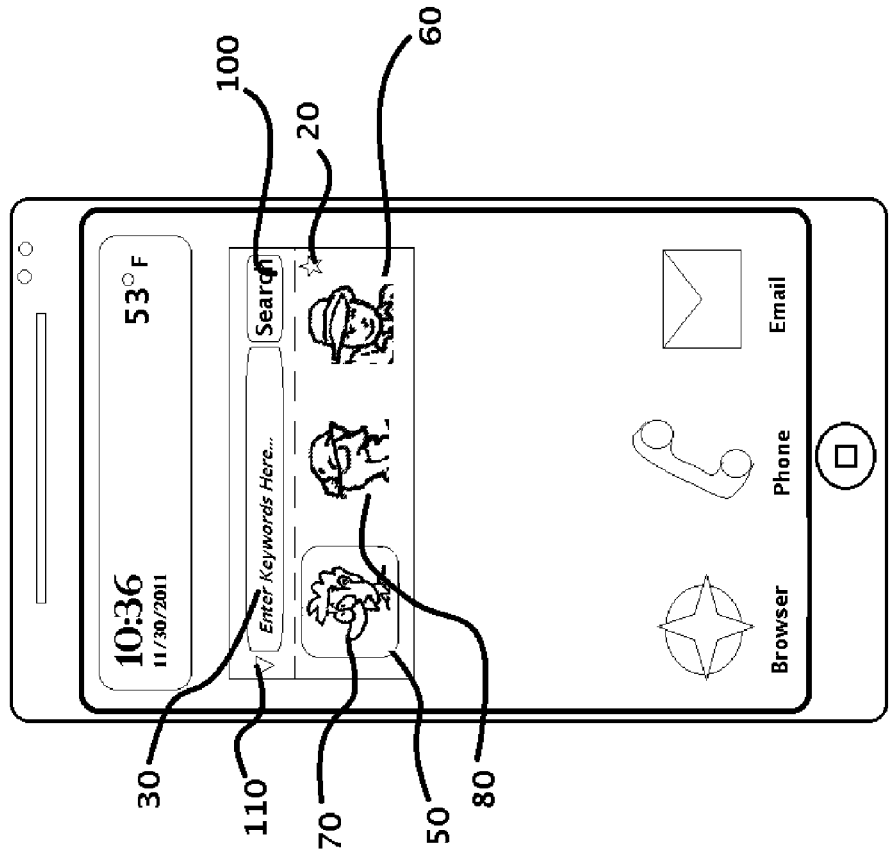
FIG. 3 shows an alternate embodiment of the present invention as a smartphone app.

As noted the product is preferably structured as a toolbar (140) that users may purchase as a feature or as an application ("app"). It is envisioned that several embodiments of the present invention will be available to users. Alternate embodiments of the present invention may include additional default avatars, or a more direct means of editing the appearance of the avatars (120). Rapid selection icons (130) may be employed in order to facilitate fast changes between multiple avatars (120), as seen in FIG. 3. A user may wish to swap avatars if he or she changes his or her mind regarding what kind of vacation is most desirable at the time. It is envisioned that the user will not have to re-type the keywords used in the search when selecting another avatar (120), rather that the search results will automatically update to reflect the persona of the newly selected avatar (120).

The present invention preferably employs a specific search algorithm, which can be broadly defined as operating in the following fashion:

1. A user selects icon representing specific avatar whose persona corresponds to the desired characteristics of the search to be conducted.

2. In the search field (30), user types a basic search keyword (e.g., "vacation")—additional specific keywords entered by the user are not necessary since these are guided by the avatar's search algorithm.
3. The avatar-specific algorithm (search code) directs 'crawlers' (using whatever browser user has—Google, Yahoo, etc.) to conduct a search that combines basic search term (e.g., "vacation") with a pre-designated set of keywords associated with the persona of the selected avatar (120). [Note: Downloading different browsers programmed using Python or other appropriate language.]
4. The search keyword set for each avatar will be selected and ordered based on their likelihood of producing results that are the closest match to the persona of the avatar (120). This keyword set will result from an avatar development process that entails the testing of potential keywords and the identification of a keyword set, and determining an order of productiveness (how productive each keyword is in finding appropriate sites) across a range of potential search topics. Keywords for each avatar are preferably ranked. A numerical value is preferably assigned to each keyword in order to reflect the rank of each search result, as well as to assist in the compilation of the final search results.
5. The ranked keyword set will then be activated to search via the browser's system, which will also typically include a page ranking and linking algorithm, such as Google PageRank. The Alter Ego algorithm may conduct a single search action or multiple repeated searches, pairing keywords with all other keywords in the set, beginning with the highest ranked keyword, and then compiling the results together. However, because a repeated search process like that could produce a voluminous amount of data, the algorithm would also include a "result limiter"—limiting each sequential search to the top 10 or 15 sites produced by the browser. The sum of the sequential searches would then be compiled based on the rank order of the search keywords used.
6. The algorithm can be represented as follows:
    Let Q represent the basic search term that is the object of the user's search (as in "vacation" noted above).
    Let M represent a given search term modifier that is part of an avatar-specific keyword set.
    Let A1 [M1 . . . Mn] represent the set of keyword search terms for a given avatar A1, where M1 is the highest ranked modifier in the set and Mn the lowest.
    Let L stand for the "result limiter" number, for example, the top 10, 15 or 20 results for each sequential search.
    A search for Q using avatar A1 would then be coded to perform the following action:

$(Q+M1)L+(Q+M2)L+(Q+M3)L+(Q+Mn)L$ $(Q+M1+M2)L+(Q+M1+M3)L+(Q+M1+Mn)L$ $(Q+M2+M3)L+(Q+M2+Mn)L$ $(Q+M3+Mn)L$

Results will be filtered (exclusion filters) for unwanted modifiers (terms that are known to produce unwanted search results vis a vis the persona of the avatar being used), then compiled in rank order—producing the SEARCH RESULT
    OR, depending on the browser, other similar algorithms will be applied, including a more basic algorithm that conducts the search as Q(A1)L, filtered for unwanted modifiers.
7. The algorithm eliminates duplicate sites that are identified in the repeated, linked keyword searches.
8. The search process of the present invention preferably produces a listing of pages and websites in an order that combines the ranked keyword search with the browser's search algorithm. The result will be a tailored search producing results that match the persona of the avatar.

It is envisioned that alternate embodiments of the present invention could include a more formal computer application instantiation, which would serve the same purpose as the toolbar embodiment, as seen in FIG. 1 as well as the FIG. 5/6 screen shot. This formal computer application would preferably be formatted to function on any conventional personal computing platform, wherein the result sets returned from the internet by the avatar-guided search are displayed within the confines of the computer application. This conventional application may be built-in to a conventional 'widget' application, designed to facilitate custom searches from the user's desktop sidebar. It is similarly envisioned that the present invention may be instantiated in a mobile device application, conventionally referred to as an "app." This alternate embodiment of the present invention can be seen in FIG. 4, wherein the "app" serves to facilitate an avatar-guided search of the internet from a mobile phone, tablet, or other internet connected device. This embodiment of the present invention preferably functions from the home screen of the mobile device, facilitating rapid searches and avatar selection with a minimal number of screen taps by the user's finger.

It is to be understood that the present invention is not limited to the embodiments as described above. There may be variations in the present invention that are not limited to the detailed description of the embodiments, but still maintain the essence of the invention as described in the specification.

I claim:

1. A method for searching for information online with an Internet-connected device by a user comprising:
    the Internet-connected device presenting the user with a search field, a search button, and a set of avatar images;
    the user selecting an avatar image from the set of avatar images;
    wherein each avatar image is a graphic representation of a fixed set of personal characteristics (persona) associated with an Internet search pattern unique to that avatar image, produced by a unique search algorithm;
    wherein the avatar persona is based on a set of personal characteristics relating to the appearance and apparent occupation of the avatar image;
    wherein each avatar image of the set of avatar images is associated with a unique search algorithm defining the filters to be employed to determine the custom-tailored result set presented to the user;
    the Internet-connected device accepting a search input into the search field by the user, the search input being a word, words, or phrase for searching;
    the Internet-connected device performing a search of the internet after the user activates the search button, the search performed based upon an algorithm associated with the avatar image, the algorithm not altered or viewed by the user, in combination with the search input;
    the Internet-connected device returning a list of search results;

the Internet-connected device filtering the list of search results according to an avatar-specific keyword set extracted as a set of words that represent the avatar persona;

wherein each keyword that is part of said avatar-specific keyword set is ranked;

wherein each keyword of the avatar-specific keyword set is not visibly shown;

creating a custom-tailored result set for the user according to the avatar-specific keyword set and algorithm of the avatar image;

the Internet-connected device presenting the user with the custom-tailored result set;

selecting a second avatar image from the set of avatar images;

the custom-tailored result set changing in accordance with the attributes of the second avatar image selected and its specific search algorithm;

wherein the unique search algorithm for a selected avatar image is executed as follows:
the user selects avatar image A1 to perform a search with input Q, executed as:

$(Q+M1)L+(Q+M2)L+(Q+M3)L+(Q+Mn)L,$ $(Q+M1+M2)L+(Q+M1+M3)L+(Q+M1+Mn)L,$ $(Q+M2+M3)L+(Q+M2+Mn)L,$ $(Q+M3+Mn)L$=Result for the user;

wherein A1 [M1 ... Mn] represents a given avatar and its specific algorithm-driven keyword set used for conducting the search, in which M1 is the highest ranked avatar-specific keyword of the avatar-specific keyword set;

wherein Q represents the search input as object of search of the Internet;

wherein M represents an avatar-specific keyword of the avatar-specific keyword set associated with the avatar image;

wherein Mn represents the lowest ranked avatar-specific keyword of the avatar-specific keyword set;

wherein L represents a result limiter configured to limit the result set displayed to a predefined value; and wherein the avatar-specific keyword set, filters, and limiters are invisible to the user.

2. The method of claim 1, further comprising:
the user selecting an adventurer avatar image from the set of avatars images;
wherein the adventurer avatar image is associated with a second set of personal characteristics common to the persona of the adventurer avatar image including 'adventurous,' 'outgoing,' 'thrill-seeking,' 'action-packed,' 'spontaneous,' and 'safari;' and
the Internet-connected device automatically performing a secondary search of the Internet based on the keyword and the second set of personal characteristics common to the appearance of the adventurer avatar image.

3. The method of claim 1, wherein the personal characteristics common to the appearance of the avatar image may be customized by the user.

4. The method of claim 1, wherein the avatar image embodies a virtual identity of the user to expedite the filtering of the list of search results by the avatar-specific keyword set commonly attributed to the alter-ego the avatar image represents.

5. The method of claim 2, wherein the personal characteristics common to the appearance of the avatar image may be customized by the user by amending the avatar-specific keyword set.

6. The method of claim 2, wherein each avatar image of the set of avatar images has a unique search algorithm defining the filters to be employed to determine the custom-tailored result set presented to the user.

7. The method of claim 2, wherein the avatar image embodies the alter-ego of the user to expedite the filtering of the list of search results according to desired criteria associated with the alter-ego of the user.

8. The method of claim 1, further comprising a first avatar image of the set of avatar images;
wherein the set of avatar images includes at least three avatar images with distinct avatar personas including:
an adventurer avatar image having characteristics and affiliations akin to one who is adventurous, including avatar-specific keywords relating to adventure;
a professor avatar image having characteristics and affiliations akin to a research professional prone to science, education, and discovery of truth, including avatar-specific keywords relating to results of science-based, educational, or philosophical inquiry; and
a parental figure avatar image having characteristics and affiliations of a guardian conventionally known to appreciate safety, family activities, family needs, family concerns, and family-size accommodations, including avatar-specific keywords relating to family-based results.

9. A method for searching for information online with an Internet-connected device by a user comprising:
first, the Internet-connected device presenting the user with a search field, a search button, and a set of avatar images;
second, the user selecting an avatar image from the set of avatar images;
wherein each avatar image is a graphic representation of a fixed set of personal characteristics (persona) associated with an Internet search pattern unique to that avatar image, produced by a unique search algorithm;
third, the Internet-connected device accepting a search input into the search field by the user, without further user intervention;
wherein each avatar image of the set of avatar images is associated with a unique search algorithm defining the filters to be employed to determine the custom-tailored result set presented to the user;
fourth, the Internet-connected device performing a search of the Internet after the user activates the search button, the search performed based upon the avatar image and the unique search algorithm of the avatar image, in combination with the search input;
wherein the unique search algorithm of the avatar image may not be seen or altered by the user;
fifth, the Internet-connected device returning a list of search results;
sixth, the Internet-connected device filtering the list of search results;
wherein each keyword of the avatar-specific keyword set is not visibly shown;
seventh, creating a custom-tailored result set for the user according to the specific keyword set of the avatar image;
eighth, the Internet-connected device presenting the user with the custom-tailored result set;

ninth, selecting a second avatar image from the set of avatar images;

tenth, the custom-tailored result set changing in accordance with the attributes of the second avatar image selected and its specific search algorithm;

wherein the unique search algorithm for a selected avatar image is executed as follows:

the user selects avatar A1 to perform a search with input Q, executed as:

$$(Q+M1)L+(Q+M2)L+(Q+M3)L+(Q+Mn)L,$$

$$(Q+M1+M2)L+(Q+M1+M3)L+(Q+M1+Mn)L,$$

$$(Q+M2+M3)L+(Q+M2+Mn)L,$$

$$(Q+M3+Mn)L=\text{Result for the user};$$

wherein A1 [M1 ... Mn] represents a given avatar image and its specific algorithm-driven keyword set used for conducting the search, in which M1 is the highest ranked avatar-specific keyword of the avatar-specific keyword set;

wherein Q represents the search input as object of search of the Internet;

wherein M represents an avatar-specific keyword of the avatar-specific keyword set associated with the avatar image;

wherein Mn represents the lowest ranked avatar-specific keyword of the avatar-specific keyword set;

wherein L represents a result limiter configured to limit the result set displayed to a predefined value; and wherein the avatar-specific keyword set, filters, and limiters are invisible to the user.

10. The method of claim 9, wherein the avatar image represents a qualification of the search entered by the user, the exact qualifications unknown to the user.

11. The method of claim 9, wherein the avatar image determines the weighting of the qualification with respect to the search entered.

* * * * *